United States Patent
Youngman et al.

(10) Patent No.: US 6,524,415 B1
(45) Date of Patent: Feb. 25, 2003

(54) METHOD OF ATTACHING AN ARTICLE TO THE INSIDE OF A TIRE CAVITY

(75) Inventors: Jonathan David Youngman, Rugby (GB); Frederick Vernon Prottey, Burntwood (GB)

(73) Assignee: Sumitomo Rubber Industries Limited, Kobe (JP)

( * ) Notice: Subject to any disclaimer, the term of this patent is extended or adjusted under 35 U.S.C. 154(b) by 158 days.

(21) Appl. No.: 09/619,711

(22) Filed: Jul. 19, 2000

(30) Foreign Application Priority Data

Jul. 20, 1999 (GB) .................................. 9916914

(51) Int. Cl.⁷ ............................................. B29D 30/06
(52) U.S. Cl. ................... 156/123; 156/110.1; 156/289; 156/310; 152/152.1; 152/510
(58) Field of Search ................................ 156/116, 123, 156/110.1, 273.3, 289, 310, 323; 152/152.1, 510, 524, 367, 450

(56) References Cited

U.S. PATENT DOCUMENTS 4,808,657 A * 2/1989 Brown ........................ 524/518
6,244,104 B1 * 6/2001 Koch et al. ............... 152/152.1

* cited by examiner

*Primary Examiner*—Geoffrey L. Knable
(74) *Attorney, Agent, or Firm*—Birch, Stewart, Kolasch & Birch, LLP

(57) ABSTRACT

A method of attaching an article to the inside surface of a pneumatic tire comprising coating an area of the inner surface of an uncured tire carcass with a first layer of adhesive, covering the first layer of adhesive with a removable masking layer comprising a flexible and heat resistant material, curing the tire carcass in a heated tire mold, removing the cured tire from the mold and removing the masking layer to expose the first layer of adhesive, coating a face of the article with a second layer of adhesive and attaching the article to the tire by bringing together the first and second layers of adhesive.

16 Claims, 1 Drawing Sheet

METHOD OF ATTACHING AN ARTICLE TO THE INSIDE OF A TIRE CAVITY

The present invention relates to a method of attaching an article to the inside of a tire cavity. Specifically the invention relates to a method of attaching an electronic microchip to the innerlining of a pneumatic tire.

Recently it has been proposed to provide a pneumatic tire with an electronic microprocessor or microchip which may be used to record and monitor operating parameters such as temperature or temperature history of the tire in use on a vehicle.

Attaching such a microchip to the outer surface of the tire, such as the sidewall, is clearly not a particularly viable option in view of the likelihood of damage due to physical impact or exposure to water or the like. The alternative of attaching the electronic component to the inside of the tire is also problematic since the innerliners of modern tubeless pneumatic tires invariably comprise one or more of a number of highly saturated butyl rubbers which in the cured state exhibit insufficient chemical reactivity to most practical adhesive systems to generate a reliable bond.

Accordingly hitherto it has been proposed to incorporate such a microchip within the tire carcass. One proposal has been to bury the microchip inside the bulky apex rubber in the tire bead region, but this is not found to be satisfactory as it requires the electronic component to withstand the rigors of tire building.

Accordingly it is an object of the present invention to provide a method of securely adhering an article such as an electronic microchip component to the inside of a tubeless pneumatic tire.

According to one aspect of the invention there is provided a method of attaching an article to the inside surface of a pneumatic tire comprising coating an area of the inner surface of an uncured tire carcass with a first layer of flexible adhesive, covering the first layer of adhesive with a removable masking layer comprising a flexible and heat resistant material, curing the tire carcass in a heated tire mould, removing the cured tire from the mould and removing the masking layer to expose the first layer of adhesive, coating a face of the article with a second layer of flexible adhesive and attaching the article to the tire by bringing together the first and second layers of adhesive.

By applying the first layer of adhesive to the inner surface of the tire whilst the rubber is in an uncured state, there exists sufficient reactivity between the adhesive and the rubber surface to assure an adequate bond.

Further aspects of the invention will become apparent from the following description by way of example only of an embodiment of the invention in conjunction with the following diagrammatic drawings in which.

The present invention relates to the problem of adhering an article such as a microchip M to the inner surface of a tire. Microchips and similar electronic devices are invariably housed in rigid plastic cases in order to protect the delicate electronics. In order to successfully mount such a component it is necessary to space it apart from the tire surface using a flexible adhesive, capable of withstanding the inevitable shearing forces generated as the tire deforms in use.

Figure 1:
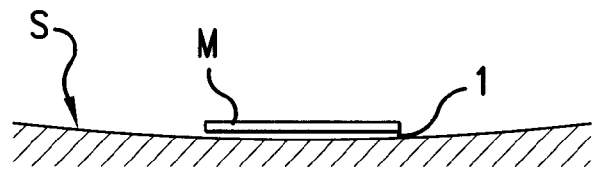
FIG. 1 shows a first layer of adhesive applied to the inner surface of a tire and covered with a masking layer.

Shown in FIG. 1 is a first layer of adhesive 1 applied to an area of the surface S of the rubber innerliner of a tubeless pneumatic tire. The adhesive may be applied by any practical means such as knife spreading or roller coating.

After application to the tire inner surface S the first adhesive layer 1 is completely covered by a masking layer (M) of a flexible heat resistant material which has the further property of only limited adhesion to the adhesive of the first layer 1 such that it can be subsequently removed.

In accordance with the invention the first layer of adhesive may alternatively be pre-applied to the masking layer and then both applied to the inside surface of the tire.

The tire with the first layer of adhesive 1 and masking layer M is then cured in a heated mould in the conventional manner. The presence of the masking layer M thus prevents the adhesive layer from being contaminated on the molding process and from adhering to the molding bladder and also discourages the adhesive layer from further spreading under the influence of the applied molding pressure.

Figure 2:
FIG. 2 shows the first layer of adhesive of FIG. 1 exposed by removal of the masking layer after tire molding.

After the cure is complete the tire is demolded and the masking layer M is removed to expose the first adhesive layer as shown in FIG. 2. Depending on the particular thickness of the first adhesive layer, the thickness of the masking layer M and the pressure applied in molding the adhesive layer may be left on the tire surface a shown or may be partially or completely impressed into the rubber or even lie below the level of the surrounding rubber.

Figure 3:
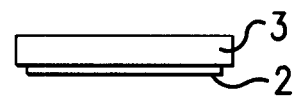
FIG. 3 shows a microprocessor coated with a second layer of adhesive.

In another operation shown in FIG. 3, a surface of the microchip 3 is coated with a second layer of adhesive 2. Again the coating may be done by a conventional means.

Figure 4:
FIG. 4 shows the microprocessor adhered to the tire.

Subsequently in the final operation the second layer of adhesive 2 is brought into contact with the first adhesive layer 1 to adhere the microchip 3 to the tire innerliner surface 5 as shown in FIG. 4.

It has been found that for the material of the first adhesive layer 1 a non-curing acrylic adhesive available from 3M as "VHB" A10 is particularly suitable for adhering to halo-butyl (chlorobutyl and bromobutyl) innerliners commonly used in tires. This material is flexible and is said to be stable over an operating temperature range of −30° to +260° C. with a maximum continuous operating temperature of 150° C. and is therefore well suited to enduring a tire curing process which typically reaches temperatures of 170–180° C. The thickness of the layer may be in the range 0.05 mm to 2.0 mm, but is preferably 0.25 mm.

In conjunction with the first adhesive material, the use of a masking layer M of a polyester film such as that available under the trade name MYLAR having a thickness in the range of 0.03 mm to 0.2 mm has been found suitable. A film thickness of 0.08 mm is particularly preferred. Such a polyester film is believed to have a melting temperature in excess of 230° C.

For the material of the second adhesive layer, another flexible non-curing acrylic adhesive available from 3M as "VHB" 4918F has been found effective with the above material of the first layer. This adhesive is believed to be stable over an operating temperature range of −30° to 150° C. with a lower maximum continuous operating temperature of 93° C. The thickness of this second layer may be in the range of 0.5 mm to 4.0 mm but is preferably 2.0 mm.

Whilst the above embodiment employs two different adhesives, the materials of both the first and second layers of adhesive may however be the same material.

Figure 5A:
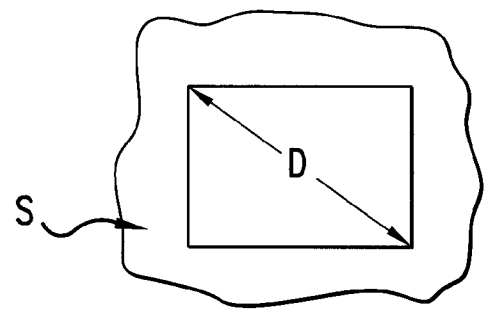
FIG. 5 shows details of the dimensions of the thickness of adhesive.
Figure 5B:
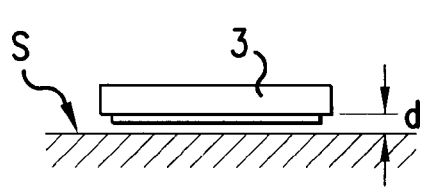
Figure 5C:
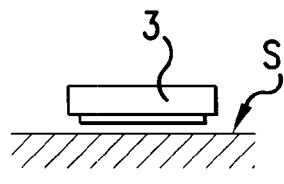

In a preferred arrangement the thicknesses of the first and second layers are selected such that the adhered microchip is held from the tire surface by a minimum distance of between 2% and 8%, preferably 4%, of its maximum linear dimension along the adhered surface, i.e. the surface to which the second adhesive layer is applied. This is illustrated in FIG. 5 which shows a plan view (5a) and front and side views (5b, 5c) of a microchip (3) mounted on a tire surface (S). Thus in accordance with the invention the microchip (3) is held from the tire surface (S) by a distance (d) which is between 2% and 8% of the maximum dimension (D) of the microchip module along its adhering surface which since this is rectangular in shape is the diagonal.

If the separating distance (d) is too small then the shear gradient through the adhesive layers becomes too large and the bond fails, and if (d) is too large it is unnecessarily wasteful of adhesive and may be prone to trapping air between the adhesive layers.

In accordance with the invention, only a portion of the first adhesive layer may be initially utilized in adhering a microchip. The remainder of the adhesive layer may be left unexposed for subsequent use in adhering another microprocessor perhaps performing a different function or a replacement microchip for example if the tire is retreaded. Alternatively of course two or more such areas of first layer of adhesive may be provided for similar subsequent additional microprocessors.

Accordingly the present invention provides a method by which a microchip may be conveniently and securely attached to the inner surface of a tubeless pneumatic tire for the purpose of monitoring its operating parameters.

What is claimed is:

1. A method of attaching an article to the inside surface of a pneumatic tire comprising coating an area of the inner surface of an uncured tire carcass with a first layer of adhesive, covering the first layer of adhesive with a removable masking layer comprising a flexible and heat resistant material, curing the tire carcass in a heated tire mould, removing the cured tire from the mould and removing the masking layer to expose the first layer of adhesive, coating a face of the article with a second layer of adhesive and attaching the article to the tire by bringing together the first and second layers of adhesive, wherein the first layer of adhesive remains unchanged by the curing of the tire.

2. A method according to claim 1, wherein the second layer of adhesive comprises a non-curing adhesive material being stable at temperatures up to 150° C.

3. A method according to claim 1, wherein the first and second layers of adhesive are the same adhesive.

4. A method in accordance with claim 1, wherein the adhered article is separated by the adhesive layers from the surrounding rubber surface by a minimum distance (d) equal to between 2% and 8% of the maximum linear distance (D) along the adhering surface of the article.

5. A method according to claim 1, wherein the first layer of adhesive has a thickness in the range of 0.05 mm to 2.0 mm.

6. A method according to claim 1, wherein the second layer of adhesive has a thickness of 0.5 mm to 4.0 mm.

7. A method according to claim 1, wherein the masking layer comprises a polyester film.

8. A method according to claim 7, wherein the masking layer has a thickness in the range of 0.03 mm to 0.2 mm.

9. A method of attaching an article to the inside surface of a pneumatic tire comprising coating an area of the inner surface of an uncured tire carcass with a first layer of adhesive, covering the first layer of adhesive with a removable masking layer comprising a flexible and heat resistant material, curing the tire carcass in a heated tire mould, removing the cured tire from the mould and removing the masking layer to expose the first layer of adhesive, coating a face of the article with a second layer of adhesive and attaching the article to the tire by bringing together the first and second layers of adhesive, wherein the first layer of adhesive comprises a non-curing acrylic adhesive material being stable at temperatures up to 200° C.

10. A method according to claim 9, wherein the second layer of adhesive comprises a non-curing adhesive material being stable at temperatures up to 150° C.

11. A method according to claim 9, wherein the first and second layers of adhesive are the same adhesive.

12. A method in accordance with claim 9, wherein the adhered article is separated by the adhesive layers from the surrounding rubber surface by a minimum distance (d) equal to between 2% and 8% of the maximum linear distance (D) along the adhering surface of the article.

13. A method according to claim 9, wherein the first layer of adhesive has a thickness in the range of 0.05 mm to 2.0 mm.

14. A method according to claim 9, wherein the second layer of adhesive has a thickness of 0.5 mm to 4.0 mm.

15. A method according to claim 9, wherein the masking layer comprises a polyester film.

16. A method according to claim 15, wherein the masking layer has a thickness in the range of 0.03 mm to 0.2 mm.

* * * * *